Figure 1:
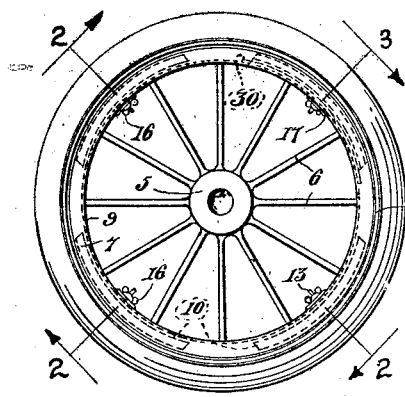

Oct. 21, 1924.

T. F. McCAMBRIDGE 1,512,616

VEHICLE WHEEL

Filed Feb. 20, 1920

T. F. McCambridge
INVENTOR.

BY F. E. Shannon
ATTORNEY.

Patented Oct. 21, 1924.

1,512,616

UNITED STATES PATENT OFFICE.

THOMAS F. McCAMBRIDGE, OF AKRON, OHIO.

VEHICLE WHEEL.

Application filed February 20, 1920. Serial No. 360,028.

*To all whom it may concern:*

Be it known that I, THOMAS F. McCAM-BRIDGE, a citizen of the United States, residing at Akron, in the county of Summit and State of Ohio, have invented new and useful Improvements in Vehicle Wheels, of which the following is a specification.

This invention relates to certain new and useful improvements in vehicle wheels of that type embodying means for fastening a demountable tire rim thereon, the tire rim being adapted for reception of a resilient tire, usually pneumatic.

The primary object of this invention is to provide a fixed rim for vehicle wheels which may be easily and cheaply manufactured from sheet metal and provided with radially movable members adapted to be forced outwardly for engagement with the inner surface of a tire rim in such manner as to effectively hold the latter operatively positioned.

A further object of the invention is to provide a fixed wheel rim with a novel form of rim holding devices capable of being readily manipulated for releasing a tire rim for permitting removal of the latter.

With the above general objects in view and others that will become apparent as the nature of the invention is better understood, the same consists in the novel form, combination and arrangement of parts hereinafter fully described, shown in the accompanying drawing and claimed.

In the drawing, forming a part of this specification, and wherein like reference characters indicate corresponding parts throughout the several views.

Figure 2:
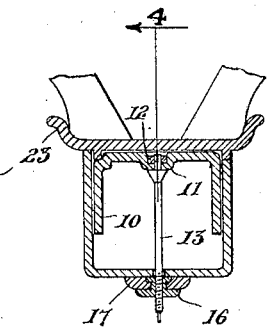
Figure 3:
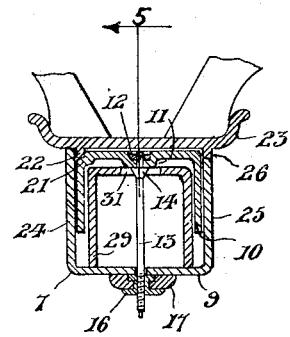
Figure 4:
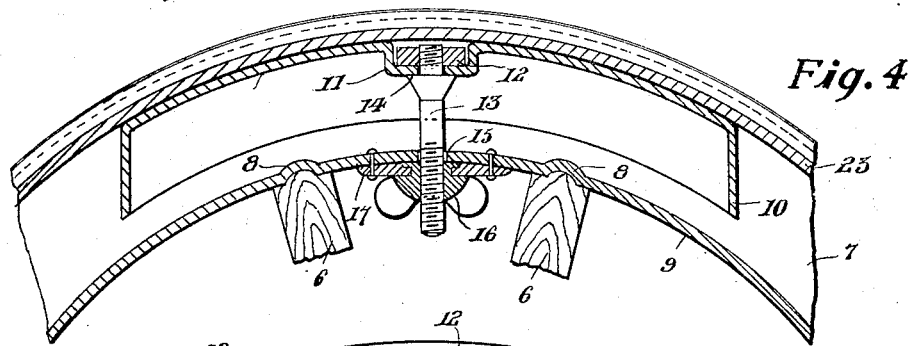
Figure 5:
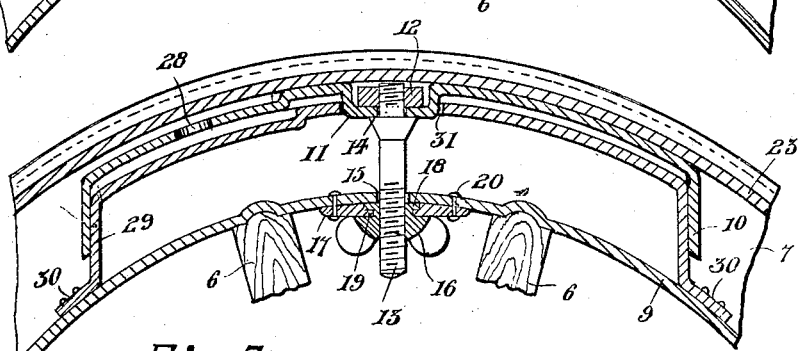

Figure 1 is a side elevational view of a vehicle wheel having a fixed rim constructed in accordance with the present invention, Figure 2 is a radial sectional view thereof taken upon one of the lines 2 of Figure 1 and shown on a larger scale, Figure 3 is a view similar to Figure 2 taken upon line 3 of Figure 1, Figure 4 is a longitudinal sectional view taken substantially upon line 4 of Figure 2 and, Figure 5 is a view similar to Figure 4 taken substantially upon line 5 of Figure 3.

Referring more in detail to the several views, the present invention comprises a fixed rim associated in the usual manner with the hub 5 having radial spokes 6. The fixed rim comprises an annular channel 7 disposed with its flanges projecting outwardly and provided with suitable sockets 8 in its base 9 for reception of the similarly shaped outer ends of the spokes 6, any suitable means being provided for rigidly retaining the spokes 6 operatively disposed with respect to the channel 7.

A plurality of radially movable members or shoes 10 are arranged at regular intervals within the channel member 7, and these radially movable members 10 are preferably formed of sheet metal and open at their inner sides. It will thus be seen that each member 10 is in the form of a segmental shoe, the side walls of which are spaced from each other such distance as to be slidably guided by the side flanges of the channel member 7. Each segmental shoe 10 is provided with a depressed central portion 11 in its outer side for reception of a nut 12 into which the threaded outer end of a screw 13 is threaded, said screw 13 being enlarged as at 14 to provide a shoulder bearing against the inner surface of the depressed portion 11. The screw 13 extends radially inwardly from each shoe 10 through an opening 15 provided in the base of the channel member 7, and has a wing nut 16 threaded upon the inner end thereof exteriorly of the channel member 7, said wing nut being retained against the inner surface of the base of the channel 7 by means of a fastening plate 17. The shank of the wing nut 16 is of circular form and fits within a similar opening provided in the plate 17, said wing nut being provided with a flanged base as at 18 which is overhung by the flange 19 of the retaining plate 17, and the wing nut 16 is thus free to be rotated although effectively retained against movement laterally relative to or away from the channel member 7. The plate 17 may be secured to the base of the channel member 7 by means of rivets 20 or the like.

Each shoe 10 is offset longitudinally along one side as at 21 to provide a seat for the inwardly projecting rib 22 which is usually provided upon the conventional form of tire rim 23, the rib 22 being positioned within the wider flange 24 of the channel member 7. The narrower flange 25 of the channel member 7 is positioned to have the rib 26 of the rim 23 rest thereon, said rib 26 being provided on the rim 23 adjacent the other side as compared to the position of the rib 22. It will thus be seen that by rotating the wing nuts 16, the screws 13 may be caused to move radially inwardly and thereby impart a similar movement to the shoes 10. When the shoes 10 are moved inwardly sufficiently the rim 23 may be slid laterally into its position as clearly shown in Figures 2 and 3 whereupon the wing nuts 16 may be rotated in a reverse direction for causing outward movements of the shoes 10 to the positions thereof as illustrated also in Figures 2 and 3 wherein the shoes 10 engage the rib 22 of the rim 23 and prevent lateral displacement of said rim from the felly. The outward movement of the shoes 10 also serve to hold the rim 23 in its proper shape as the shoes 10 are of considerable length and the spaces between the same are comparatively short.

Any one of the shoes 10 may be provided with the usual opening 28 for reception of the usual stud (not shown), which may be provided on the rim 23 for preventing circumferential creeping of the latter, and in order to relieve the shoes 10 and screws 13 against undue strains due to this tendency of the rim 23 to creep circumferentially, I arranged a sheet metal member 29 within the channel 7 of such form as to slidably fit within the adjacent shoe 10, the member 29 being provided with base flanges as at 30 which are riveted or otherwise suitably fastened to the base of the channel 7. The member 29 is provided with a central opening as at 31 into which the central depression 11 may pass when the shoe 10 is radially moved either inwardly or outwardly as the case may be.

From the foregoing description, it is believed that the construction and operation as well as the advantages of the present invention will be readily appreciated by those skilled in the art.

It will be understood that various changes may be made in the details of construction herein specifically described without departing from the spirit and scope of the invention as claimed.

Having thus described my invention what I claim as new and desire to secure by Letters Patent is:—

1. In a vehicle wheel, a fixed rim comprising an integrally formed annular channel disposed with its flanges projecting outwardly and adapted to have its base fastened to the outer ends of the spokes of a wheel, segmental hollow metallic shoes disposed at intervals within said channel, said shoes provided with inwardly projecting flanges adapted to be received between and radially guided in sliding inward and outward movements by the side flanges of said channel, central screws rigidly fastened to said shoes and projecting radially inwardly through the base of said channel, and nuts having swivel connection with the base of said channel member and threaded upon said screws whereby rotation of said nuts will cause radial movement of said shoes for securing a tire rim on the fixed rim or releasing the same from the latter.

2. In a vehicle wheel in combination, a fixed rim comprising an annular channel disposed with its flanges projecting outwardly and adapted to have its base fastened to the outer ends of the spokes of a wheel hollow, segmental metallic shoes provided with inwardly projecting flanges, said shoes disposed at intervals within said channel, a hollow segmental member fixed in said channel and received in the cavity of one of said shoes, central screws rigidly fastened to said shoes and projecting radially inwardly through said segmental member and the base of said channel and nuts having swivel connection with the base of said channel member and threaded upon said screws whereby rotation of said nuts will cause radial movement of said shoes for securing a tire rim on the fixed rim or releasing the same from the latter, a segmental member rigidly fastened to said channel and slidably fitting within one of said shoes for bracing the latter against lateral or circumferential movement due to the tendency of the tire rim to creep or the like.

In testimony whereof I have hereunto set my hand.

THOMAS F. McCAMBRIDGE